March 26, 1963 A. G. HABIB ET AL 3,083,209
OZONIDATION PROCESS
Filed July 1, 1959

FIGURE I

MAKE UP O$_2$

OZONATOR 1a — 2a — ADSORBER 3a (4a in, 5a out) — 6a — REACTOR 7a (8a, 9a in, 10a out)

FIGURE II

MAKE UP O$_2$ — 10 — OZONATOR 1 — 2
INERT MAKE UP — 16
ADSORBERS 5, 13 with valves 4, 11, 7, 15, ports 3, 6, 8, 9, 12, 14
REACTOR 18 (inputs 19, 20; line 6; line 17; recycle 23 via pump 21, valve 22)

Austin G. Habib
John F. Ryan   INVENTORS

BY Seymour Stahl
PATENT ATTORNEY 3,083,209
OZONIDATION PROCESS
Austin G. Habib, Elizabeth, and John F. Ryan, Westfield, N.J., assignors to Esso Research and Engineering Company, a corporation of Delaware
Filed July 1, 1959, Ser. No. 824,255
2 Claims. (Cl. 260—339)

This invention relates to the ozonidation of unsaturated organic compounds.

In particular, this invention relates to new and improved methods for producing the ozonides of unsaturated organic compounds wherein the ozone reactant is separated from the mother gas from which it is produced, i.e. oxygen, prior to introduction of the ozone into the reaction medium.

It is known in the art that olefinically unsaturated organic compounds containing one or more double bonds will react with ozone. When the reaction is conducted in the presence of a solvent which is reactive with ozone under the conditions of reaction, e.g. formic acid, acetic acid, methanol, etc., the product formed is a peroxidic interreaction product of the ozone, solvent and unsaturated organic reactant which contains substituent groups, e.g. alkoxy groups, derived from the solvent. When the reaction is conducted in the presence of a solvent which is essentially inert to ozone under the conditions of reaction, e.g. carbon tetrachloride, chloroform, methyl acetate, etc., the reaction proceeds by a different mechanism to form an ozonide which is soluble in the solvent but may be insolubilized to form a polymeric ozonide by warming the ozonide-containing solution to ambient temperatures and treating with a precipitating agent such as ligroin. The monomeric or simple ozonides have a structure which is believed to conform to one or the other of the two formulas:

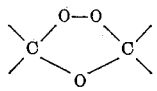

or

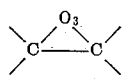

The olefinically unsaturated organic compounds suitable for ozonidation include $C_2$ to $C_{30}$ hydrocarbons and substituted hydrocarbons. Thus, in addition to the many hydrocarbon-ozone derived ozonides, the ozonides of substituted hydrocarbons containing nitrile, carboxyl and esterified carboxyl groups are known to the art as are the ozonides of heterocyclic compounds such as furan. The hydrocarbons suitable for preparing ozonides contain one or more double bonds, e.g. 1 to 4, and include arylalkyl compounds and alkylaryl compounds as well as cyclic and acyclic aliphatic compounds.

Thus, suitable hydrocarbons for use in preparing ozonides include bicyclo (2.2.1)-2-heptenes such as norbornylene [bicyclo (2.2.1)-2-heptene], and $C_1$ to $C_4$ alkyl substituted norbornylenes, e.g. 5-methyl-bicyclo (2.2.1)-2-heptene, 5-propyl-bicyclo (2.2.1)-2-heptene, 5-ethyl bicyclo (2.2.1)-2-heptene, 5,5,6-trimethyl-bicyclo (2.2.1)-2-heptene, 5,6-dimethyl-bicyclo (2.2.1)-2-heptene, etc.; monocyclic olefins such as cyclopentene, 3-methylcyclohexene, 4-methylcyclohexene, 2,3,3-trimethylcyclopentene, 1-n-butylcyclopentene, cyclohexene, cycloheptene, cyclooctene, cyclohexadiene, cyclododecene, etc., 4-vinylcyclohexene, 1,5-cyclooctadiene, 1,5,9-cyclododecatriene, etc.; and open chain olefins such as butene-1, butene-2, 1,5-hexadiene, pentene-1, straight and branched chain heptenes, octenes, decene-1, dodecene-1, etc. The dicyclic diolefins of the norbornylene type may be prepared by the Diels Alder reaction of the cyclic diolefin with an open chain monoolefin (see Joshel and Butz, J. Am. Chem. Soc., vol. 63, page 3350, 1941). The vinyl cyclohexene, cyclooctadiene, and cyclododecatriene may be prepared by the dimerization and trimerization, respectively, of butadiene. Acrylonitrile, acrylic acid and acrylic esters are also suitable feed stocks for ozonidation.

Ozonides are valuable compounds for a variety of uses known to the art. For instance, they may be employed as catalyst in the polymerization of ethylene and other olefinic hydrocarbons, oxidized to form various acids and hydrogenated to form alcohols.

In the past ozonides have been produced at temperatures within the range of about —100° to about 30° C. by passing a stream of oxygen containing from about 0.5 to 6 volume percent ozone through a solution of the unsaturated organic compound in an excess of a relatively volatile, low molecular weight, solvent which is substantially inert to ozone under the conditions of reaction. Solvents which have been employed for this purpose include iso-octane, n-heptane, cyclohexane, ethyl acetate, chloroform and carbon tetrachloride. By this process the ozone-oxygen mixture is usually passed through the solution at a rate within the range of about 0.01 to about 0.5 cubic feet of gaseous mixture per liter of solution per minute until the theoretical amount of ozone has been absorbed.

Several troublesome problems are inherent in a process of this type. With the passage of large volumes of oxygen through the reaction zone the relatively volatile solvents are vaporized in unsatisfactorily high amounts and carried from the reactor as vapors or small droplets with the oxygen off-gas. When the unsaturated compound subjected to ozonidation is a relatively volatile compound this reactant as well as some of the ozonide product may also be carried from the reactor in the same manner. Ozone is produced by a silent electric discharge in air or oxygen by methods well known in the art. A device in which ozone is generated is commonly known as an ozonator. After passing through the reaction zone the oxygen stream is recycled to the ozonator. The recovery of solvent, reactants and/or products from the oxygen recycle stream between the ozonidation reactor and the ozonator is both difficult and expensive. For efficient operation, the solvent which is not recovered must be removed prior to reintroducing the recycle oxygen to the ozonator and conventionally is burned in a catalytic converter resulting in further losses.

It has now been discovered that solvent, reactant and product losses can be minimized and the aforementioned recovery problems eliminated by separating the ozone necessary for ozonidation from the oxygen carrier prior to contacting the solvent and organic reactant with the ozone reactant.

In one embodiment of this invention this is accomplished by first absorbing the ozone in an inert solvent of low volatility such as an ester boiling in the range of about 140 to about 220, preferably 140 to 200, ° C., which is a liquid under the conditions employed in ozonidation, and then mixing the ozone-containing solvent with the reactant or a solution of the reactant. Separation of the reaction and absorption steps perimts the absorption of ozone at a lower temperature than the mixed mean temperature of the reaction and thus reduces the amount of solvent evaporated into the oxygen carrier gas stream. This method also permits absorption under pressure. The ozonidation reaction may then be carried out at lower pressures or at atmospheric pressure if in a particular ozonidation pressure has an adverse effect on the reaction. The use of the less volatile solvent further reduces the carryover of solvent with the oxygen stream and completely eliminates the carryover of the organic reactant and ozonide products. Examples of esters which are suitable for this purpose include amyl acetate, iso amyl acetate, butyl butyrate, isobutyl butyrate, iso butyl valerate, iso amyl butyrate, 2-ethyl hexyl acetate, etc.

The invention may be practiced with a more volatile solvent such as those known to the art and hereinbefore mentioned and the benefits of minimizing reactant and product losses realized. However, with a more volatile solvent the carryover of solvent with the recycle oxygen stream still presents the problems of solvent loss and solvent recovery hereinbefore discussed.

If a reactive solvent is employed to produce a peroxidic interreaction product of the type hereinbefore described, a reactive solvent of low volatility should be chosen. Suitable solvents for this purpose include alcohols and organic acids consisting of carbon, hydrogen and oxygen which have a boiling point within the range hereinbefore set forth for inert solvents and which are liquids under the conditions employed in ozonidation.

The aforedescribed embodiment may be more easily understood by referring to FIGURE I of the accompanying drawings.

A stream of air or oxygen containing about 0.5 to 6 volume percent ozone is removed from vessel 1–A, a conventional ozonator via line 2–A and introduced into absorber 3–A. Absorber 3–A may be a conventional absorption tower constructed of materials, e.g. carbon steel, suitable to withstand both the subatmospheric and superatmospheric pressures particularized later herein. Absorber 3–A is maintained at a temperature between the boiling point and the freezing point of the solvent employed therein and within the range of about −50 to 40, preferably 0 to 25, ° C., under a pressure in the range of about 1 to 15, preferably 1 to 10, atmospheres. A solvent of low volatility which is substantially inert to ozone under the conditions of reaction, e.g. amyl acetate, is introduced into absorber 3–A via line 4–A. If the process is operated as a batch process, the aforementioned ozone-containing gas is passed through the amyl acetate at a rate within the range of about 0.01 to about 0.5 cubic feet of gaseous mixture per liter of solvent per minute until a substantial amount of ozone has been selectively absorbed or until the amount or ozone in the absorber off-gas is equal to about 10–15 volume percent of the amount of ozone entering the absorber in the feed gas. If the process is operated as a continuous process the aforementioned ozone-containing gas is passed through the amyl acetate until about 1 to 1,000, preferably 10 to 100, cubic feet of the gaseous mixture has passed through per cubic foot of the solvent. The ozone is selectively absorbed from the oxygen-comprising stream and the ozone desorbed oxygen stream leaves absorber 3–A via line 5–A and is recycled to ozonator 1–A. The ozone-containing solvent is removed from absorber 3–A via line 6–A and introduced into ozonidation reactor 7–A. Reactor 7–A is preferably a closed vessel which may be constructed of the same or similar materials as absorber 3–A and is equipped with a convention agitation means 8–A which may be a mechanical stirring device or a pump-around system. An unsaturated organic compound such as norbornylene is introduced into reactor 7–A via line 9–A. The mol ratio of organic reactant to solvent in reaction vessel 7–A should be maintained in the range of about 2:20::1. Reactor 7–A is maintained at a temperature in the range of about −50 to 40, preferably 0 to 25, ° C., under a pressure in the range of about 1 to 15, preferably 1 to 10, atmospheres. The average residence time of the reaction mixture, i.e. reactants and solvent, in reactor 7–A should be in the range of about 0.5 to 4 hours. The resulting solution containing the norbornylene ozonide may be removed from reactor 7–A via line 10–A for further processing. For example, the ozonide may be oxidized by means well known in the art to form norcamphoric acid. This process may be operated either as a batch, semi-continuous or continuous process.

In another embodiment of the invention ozone is selectively adsorbed from the oxygen-comprising stream on a solid adsorbent such as activated charcoal, silica gel, crystalline zeolites (molecular sieves), etc., desorbed from such adsorbent by stripping with an inert gas such as nitrogen. The inert gas stream containing ozone is then continuously recycled through the reaction zone using a closed gas circuit to minimize losses of solvent, reactant and product. Other gases which may be used for desorption and which are essentially inert to ozone at the temperatures of desorption and ozonidation include $C_1$ to $C_3$ saturated acyclic hydrocarbons. Suitable zeolite adsorbents for this purpose may be prepared according to the methods disclosed in U.S. Patents 2,882,243 and 2,882,244.

This embodiment may be more easily understood by referring to FIGURE II of the accompanying drawings.

A stream of air or oxygen containing about 0.5 to 6 volume percent ozone is removed from vessel 1, a conventional ozone generator wherein ozone is produced from oxygen by a silent electric discharge, and introduced into adsorber 5 via lines 2 and 3, valve 4 and line 17. Adsorber 5 may be a conventional adsorption tower constructed to withstand both subatmospheric and superatmospheric pressures and filled with a solid adsorbent such as activated charcoal. Adsorber 5 is operated during the adsorption step at a temperature in the range of about −50 to 40, preferably 0 to 25, ° C. and under a pressure in the range of about 1 to 15, preferably 1 to 10 atmospheres. The ozone-containing gas is passed through adsorber 5 wherein ozone is selectively adsorbed on said charcoal until an appreciable amount of ozone has been adsorbed or until the amount of ozone leaving adsorber 5 with the oxygen-comprising off-gas is approximately equal to the amount of ozone in the ozone-containing feed stream to adsorber 5. It is preferred to end the adsorption step when the amount of ozone in the off-gas stream is equal to about 10 to 15 percent of that in the feed stream. The oxygen-comprising off-gas exits from adsorber 5 via line 6, and passes through valve 7 into lines 8, 9 and 10 to ozonator 1. When the adsorption step is completed in adsorber 5, valve 4 is reversed stopping the flow of ozone-containing feed gas from line 3 into line 17 and valve 11 which had closed line 3 from 12 is reversed to admit this stream from line 3 into line 12. This position of valve 11 closes line 12 to line 17. The ozone-containing feed gas from ozonator 1 then passes via lines 2 and 3 through valve 11 and line 12 into adsorber 13 which may be constructed in the same manner as adsorber 5 and which contains the same or a similar adsorbent to that in adsorber 5. The adsorption step is then conducted as in adsorber 5 and the off-gas exits from adsorber 13 via line 14. This stream is diverted by valve 15 into lines 8, 9 and 10 to ozonator 1. While adsorption is being carried out in adsorber 13, an inert gas such as nitrogen is passed via line 14, valve 16, valve 7, and line 6 to adsorber 5 to desorb the ozone previously adsorbed on the charcoal therein. While the desorption step is being carried out the adsorber which is on stream for desorption is operated at a temperature in the range of −50 to 40, preferably 0 to 25, ° C. and under a pressure in the range of 0.1 to 15, preferably 0.1 to 10, atmospheres. The resulting ozone-containing nitrogen stream is removed from adsorber 5 via line 17, and passed via valve 4 to reactor 18. Reactor 18 is an enclosed reaction vessel constructed to withstand both subatmospheric and superatmospheric pressures. Reactor 18 is operated at a temperature in the range of about −50 to 40, preferably 0 to 25, ° C. under a pressure in the range of 1 to 15, preferably 1 to 10, atmospheres. An unsaturated organic compound such as cyclohexene is introduced into reactor 18 via line 19. A solvent of low volatility which is inert to ozone under the conditions of reaction such as 2-ethyl hexyl acetate is introduced into reactor 18 either admixed with the cyclohexene in line 19 or separately via line 20. The mol ratio or organic reactant to solvent in reactor 18 should be maintained in the range of about 1:0.5 to 1:40, preferably 1:2 to 1:20. Reactor 18 is equipped with an agitation means such as the pump-around means shown in FIGURE II to provide a thorough mixing of the ozone-containing nitrogen stream introduced via line 17 with the solution of cyclohexene. The resulting ozonide-containing solution may be stirred with a mechanical stirring device or continuously withdrawn from reactor 18 via line 21 and passed through valve 22 from whence a portion of this stream may be continuously recycled to reactor 18 via line 23 and while the remainder leaves via line 21 for recovery of the ozonide or further processing. In the alternative, valve 22 may be intermittently closed and opened so that at any given time the entire stream from line 21 either exits from the system or is recycled to reactor 18. Optionally, a heat exchange unit of conventional design may be placed on line 23 for dissipating the heat of reaction from the stream prior to its reentry into reactor 18. This, of course, helps to control the temperature in reactor 18. The average residence time for the reactants in reactor 18 should be in the range of about 0.5 to 4 hours.

The nitrogen off-gas from reactor 18 is removed via line 6 and is recycled to the adsorber on stream for desorption. If adsorber 13 is on stream for desorption this stream passes via line 6, valve 16, line 14 and valve 15 to adsorber 13. If adsorber 5 is on stream for desorption the stream passes via line 6, valve 16, and valve 7 to adsorber 5. When adsorber 13 is undergoing desorption valve 11 closes line 3 from line 12 and the ozone-containing nitrogen stream from adsorber 13 passes via line 12, valve 11 and line 17 to reactor 18. Adsorbers 5 and 13 may be equipped with means for supplying heat to the adsorbers to prevent or remove any accumulation of solvent on the adsorbent. This may also be accomplished by increasing the rate of flow of the nitrogen through the adsorber or a reduction in pressure in the adsorber during desorption. A conventional heat exchange unit may be located along line 6 for changing the temperature of the inert gas recycle stream between reactor 18 and the adsorbers. Air may be used as the desorbing gas.

Another embodiment which may be used employs an apparatus such as that just discussed except that it requires a heat exchange unit between the reactor and the desorber step for vaporizing the recycle stream from the reactor to the desorption operation and a second heat exchange unit between the adsorber and the reactor for cooling and condensing the desorption gas before it enters the reactor. In this embodiment the inert desorbing gas and the solvent employed in the reactor are one and the same. Solvents which are substantially inert to ozone under the conditions of desorption and ozonidation and which would be suitable for use in this embodiment include $C_4$ through $C_8$ saturated hydrocarbons such as the acyclic butanes, pentanes, hexanes, heptanes and octanes, and low molecular weight esters such as methyl formate, ethyl formate, and ethyl acetate.

*Example I*

A stream of oxygen containing 2 volume percent ozone is passed through butyl valerate maintained at a temperature of about 0° C. until the off-gas leaving the ester liquid contains about 0.2 volume percent ozone. The flow of oxygen-comprising gas is discontinued and nonene-1 is added to the ozone-containing ester liquid in a hydrocarbon to ester ratio of 1 to 10. The resulting solution is stirred for about one hour at a temperature of about 0° C. An ozonide of nonene-1 precipitates from the ester solution. Stirring is continued until precipitation ceases. The ester liquid is separated from the ozonide and the ozonide is recovered and analysed. The analysis reveals the precipitate to contain oxygen, carbon and hydrogen in amounts confirming an equimolar addition of ozone to nonene-1.

*Example II*

To the precipitate of Example I is added ethyl acetate in a molar excess, i.e. about 20 mols of the ester per mol of ozonide, and a molar excess of water based on the ozonide precipitate. The mixture is heated to about 100° C. and oxygen containing a trace of ozone, i.e. about 0.1 volume percent, is passed through the resulting solution. The ethyl acetate is distilled off and the resulting product is found to contain caprylic acid.

*Example III*

A stream of oxygen containing about 4 volume percent ozone is passed through an adsorption vessel containing activated charcoal and maintained at a temperature of about 20° C. under a pressure of about 5 atmospheres. The ozone is selectively adsorbed on the charcoal and the flow of gas through the charcoal is continued until the off-gas contains about 0.5 volume percent ozone. The flow of oxygen and ozone through the adsorber is discontinued and a stream of nitrogen is passed through the adsorber to desorb the adsorbed ozone from the charcoal at atmospheric pressure. The ozone is adsorbed in the nitrogen stream and the ozone-containing nitrogen is passed into a reaction vessel into which norbornylene and amyl acetate are continuously introduced in a reactant to solvent ratio of 1 to 20. The reaction zone is maintained at a temperature of about 20° C. under a pressure of about 2 atmospheres. The ozone-containing nitrogen is continuously passed through the solution of norbornylene and amyl acetate which is continuously agitated for good mixing. An ozonide of norbornylene is formed and is continuously removed in solution with the norbornylene and amyl acetate solution for separation and oxidation to the corresponding acid, i.e. norcamphoric acid, by methods well known in the art. The ozone desorbed nitrogen stream is continuously recycled to the aforesaid charcoal or duplicate beds of the same to pick up a fresh supply of ozone. The nitrogen stream passes in a cycle through an essentially closed circuit thereby minimizing losses of solvent, reactant and product.

*Example IV*

An unsaturated organic compound such as those hereinbefore disclosed is subjected to ozonidation exactly as in Example III except for the single difference that the solvent employed is 2-ethyl hexyl acetate and an ozonide of said compound is produced.

*Example V*

An unsaturated organic compound such as those hereinbefore disclosed is subjected to ozonidation exactly as in Example III except for the single difference that silica gel is employed as the adsorbent in lieu of the activated charcoal and an ozonide of said compound is produced.

*Example VI*

An unsaturated organic compound such as those hereinbefore disclosed is subjected to ozonidation exactly as in Example III except for the single difference that a 4–5 A. crystalline zeolite is employed as the adsorbent in lieu of the activated charcoal and an ozonide of said compound is produced.

*Example VII*

An unsaturated organic compound such as those hereinbefore disclosed is subjected to ozonidation exactly as in Example III except for the single difference that ethane is employed in lieu of nitrogen gas and an ozonide of said compound is produced.

Example VIII

An unsaturated organic compound such as those hereinbefore before disclosed is subjected to ozonidation exactly as in Example III except for the single difference that the adsorption of ozone from the ozone-containing oxygen is at atmospheric pressure and an ozonide of said compound is produced.

Example IX

An unsaturated organic compound such as those hereinbefore before disclosed is subjected to ozonidation exactly as in Example III except for the single difference that the desorption of ozone from the solid adsorbent is conducted at a subatmospheric pressure of about 0.1 atmospheres and an ozonide of said compound is produced.

Example X

An unsaturated organic compound such as those hereinbefore before disclosed is subjected to ozonidation exactly as in Example III except for the single difference that the desorption of ozone from the solid adsorbent is conducted at a superatmospheric pressure of about 15 atmospheres and an ozonide of said compound is produced.

Example XI

An unsaturated organic compound such as those hereinbefore before disclosed is subjected to ozonidation exactly as in Example III except for the single difference that the reaction zone is operated at atmospheric pressure and an ozonide of said compound is produced.

Example XII

An unsaturated organic compound such as those hereinbefore before disclosed is subjected to ozonidation exactly as in Example III except for the single difference that the carrier gas for the ozone feed to the adsorber is air and an ozonide of said compound is produced.

Example XIII

An ozonide is produced exactly as in Example III except for the single difference that the adsorption, desorption and reaction steps are carried out at a temperature of about $-10°$ C.

Example XIV

An ozonide is produced exactly as in Example III except for the single difference that the compound subjected to ozonidation is cyclohexene.

Example XV

An ozonide is produced exactly as in Example III except for the single difference that the compound subjected to ozonidation is butadiene.

Example XVI

An ozonide is produced exactly as in Example III except for the single difference that the compound subjected to ozonidation is acrylic acid.

Example XVII

An ozonide is produced exactly as in Example III except for the single difference that the compound subjected to ozonidation is methyl acrylate.

Example XVIII

An ozonide is produced exactly as in Example III except for the single difference that the compound subjected to ozonidation is acrylonitrile.

Example XIX

An ozonide is produced exactly as in Example III except for the single difference that the compound subjected to ozonidation is furan.

The foregoing examples are meant to be illustrative and should not be construed as limiting the scope of the invention.

The terms "unsaturated organic compounds," "olefinically unsaturated organic compounds" as used herein refer only to those unsaturated organic compounds which possess per molecule one or more carbon to carbon double bond linkages, i.e. compounds containing the group $>C=C<$.

The terms "unsaturated hydrocarbons" and "olefinically unsaturated hydrocarbons" as used herein refer only to compounds of carbon and hydrogen which contain one or more carbon to carbon double bond linkages.

The terms "oxygen comprising stream" and "oxygen comprising gas" as used herein shall be understood to mean an oxygen-containing gas wherein the oxygen content is between 10 and 100 volume percent.

The terms "inert," "inert gas" and "inert solvent" refer to a compound or element which is chemically inert (non-reactive) with respect to ozone and the intermediates and products formed during the ozonidation of an olefinically unsaturated organic compound at a temperature in the range of $-50°$ to $40°$ C.

The terms "essentially inert," "essentially inert gas," and "essentially inert solvent" refer to a compound, element or substance which for all practical purposes including the processes carried out herein is non-reactive with ozone and the intermediates and products formed during the ozonidation of an olefinically unsaturated organic compound at the temperature at which such processes are carried out, said temperatures being in the range of $-50°$ to $40°$ C., but which may possess a minimal ability to react very slowly with ozone if exposed to the same for long periods of time, i.e. a reactivity no greater than that of a saturated acyclic hydrocarbon with ozone at such temperatures.

All percentages recited herein unless otherwise designated or explained shall be interpreted to mean percent by volume.

What is claimed is:

1. In the process of producing ozonides of olefinically unsaturated hydrocarbons by contacting said hydrocarbons with ozone at a temperature in the range of about $-50°$ to $40°$ C. at about 1 to 15 atmospheres pressure, the improvement which comprises passing an ozone-oxygen gas mixture through an adsorption zone containing a solid adsorbent selected from the group consisting of charcoal, silica gel and crystalline zeolites until a substantial amount of ozone is adsorbed on said adsorbent, stopping the flow of said mixture through said adsorption zone, passing a stream of nitrogen through said adsorbent at a temperature in the range of $-50$ to $40°$ C. and a pressure in the range of 0.1 to 10 atmospheres to desorb said ozone from said adsorbent, passing the resulting ozone containing gas stream through a closed reaction zone maintained at a temperature in the range of about $-50$ to $40°$ C., at a pressure of about 1 to 15 atmospheres, and containing a solution of a $C_2-C_{30}$ olefinically unsaturated hydrocarbon and an alkyl ester of a carboxylic acid which is substantially inert to ozone at $-50°$ to $40°$ C., said ester boiling in the range of $140°$ to $220°$ C., removing from an upper portion of said reaction zone the resulting gas stream of reduced ozone content, recycling same by closed circuit to said adsorption zone, and recovering reaction product of said ozone and said hydrocarbon from a lower portion of said reaction zone.

2. A process in accordance with claim 1 wherein said ester is amyl acetate.

References Cited in the file of this patent

UNITED STATES PATENTS

| | | |
|---|---|---|
| 1,951,708 | Rankin | Mar. 20, 1934 |
| 2,833,786 | Purvis | May 6, 1958 |
| 2,874,164 | Hann | Feb. 17, 1959 |
| 2,897,209 | Kodras | July 28, 1959 |
| 2,904,555 | Kodras | Sept. 15, 1959 |